(12) United States Patent
Kitazawa et al.

(10) Patent No.: US 12,049,047 B2
(45) Date of Patent: Jul. 30, 2024

(54) JIG AND COMPOSITE MATERIAL PROCESSING METHOD

(71) Applicant: MITSUBISHI HEAVY INDUSTRIES, LTD., Tokyo (JP)

(72) Inventors: Toshiki Kitazawa, Tokyo (JP); Hiroaki Nakamura, Tokyo (JP); Masahiko Shimizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 161 days.

(21) Appl. No.: 17/801,891

(22) PCT Filed: Jun. 17, 2020

(86) PCT No.: PCT/JP2020/023865
§ 371 (c)(1),
(2) Date: Aug. 24, 2022

(87) PCT Pub. No.: WO2021/255880
PCT Pub. Date: Dec. 23, 2021

(65) Prior Publication Data
US 2023/0100087 A1 Mar. 30, 2023

(51) Int. Cl.
*B29C 70/34* (2006.01)
*B29C 33/38* (2006.01)
*B29C 43/36* (2006.01)

(52) U.S. Cl.
CPC ............ *B29C 70/34* (2013.01); *B29C 43/36* (2013.01); *B29C 2043/3602* (2013.01)

(58) Field of Classification Search
CPC ....... B29C 33/76; B29C 33/505; B29C 33/50; B29C 33/485; B29C 70/462; B29C 70/34; B29C 70/446
See application file for complete search history.

(56) References Cited

U.S. PATENT DOCUMENTS

| | | | | |
|---|---|---|---|---|
| 453,592 A | * | 6/1891 | Gardner | B27D 1/083 144/256.1 |
| 2,964,082 A | * | 12/1960 | Cousins | B60C 11/185 D12/502 |

(Continued)

FOREIGN PATENT DOCUMENTS

| JP | 2006123402 A | 5/2006 |
|---|---|---|
| JP | 2015227049 A | 12/2015 |

(Continued)

OTHER PUBLICATIONS

International Search Report for International Application No. PCT/JP2020/023865 mailed Sep. 24, 2020; 5pp.

*Primary Examiner* — Matthew J Daniels
(74) *Attorney, Agent, or Firm* — HAUPTMAN HAM, LLP

(57) ABSTRACT

A block is configured such that, when a composite material having a curved part in a cross-sectional shape cut by a plane orthogonal to an X-axis is deformed into a shape corresponding to a mold through pressure application while being kept in the mold, the block is brought into contact with the curved part of the composite material. The block includes: a first contact part which extends along the X-axis direction so as to be in contact with the curved part of the composite material; and a second contact part which is partially disposed along the X-axis direction, is in contact with the curved part of the composite material, and is of higher rigidity than the first contact part.

6 Claims, 7 Drawing Sheets

(56) References Cited

U.S. PATENT DOCUMENTS

| | | | | |
|---|---|---|---|---|
| 3,182,706 | A * | 5/1965 | Cousins | B60C 11/185 152/211 |
| 3,962,393 | A * | 6/1976 | Blad | B29D 22/00 264/318 |
| 4,310,138 | A * | 1/1982 | Johnston | B29C 33/485 249/178 |
| 4,520,562 | A * | 6/1985 | Sado | B29C 70/885 439/492 |
| 4,786,456 | A * | 11/1988 | Witte | B29C 53/083 425/383 |
| 4,822,436 | A * | 4/1989 | Callis | B29C 70/30 156/264 |
| 5,087,193 | A * | 2/1992 | Herbert, Jr. | B29C 70/544 425/389 |
| 5,286,438 | A * | 2/1994 | Dublinski | B29C 33/30 264/225 |
| 5,354,195 | A * | 10/1994 | Dublinski | B29C 43/3642 428/116 |
| 5,387,098 | A * | 2/1995 | Willden | B29C 33/50 264/313 |
| 5,597,435 | A * | 1/1997 | Desautels | B29C 33/30 264/258 |
| 5,817,269 | A * | 10/1998 | Younie | B29C 33/38 249/82 |
| 6,245,278 | B1 | 6/2001 | Lausenhammer | B29C 45/27 425/549 |
| 6,478,922 | B1 * | 11/2002 | Rosevear | B29C 70/543 264/319 |
| 6,491,778 | B1 * | 12/2002 | Fenton, Jr. | B29C 70/34 473/319 |
| 8,535,042 | B1 * | 9/2013 | Kirkpatrick | B29C 70/461 425/389 |
| 9,781,937 | B2 * | 10/2017 | Bolckmans | A01K 67/033 |
| 9,840,063 | B2 * | 12/2017 | De Mattia | B29D 99/0003 |
| 10,456,961 | B2 * | 10/2019 | Terasaka | B29C 65/02 |
| 10,906,210 | B2 * | 2/2021 | Register | B29D 99/0014 |
| 2001/0035249 | A1 * | 11/2001 | Kondo | B29D 99/0003 156/65 |
| 2002/0027187 | A1 * | 3/2002 | Sato | B29D 99/0014 249/187.1 |
| 2006/0108057 | A1 * | 5/2006 | Pham | B29C 70/446 156/583.1 |
| 2009/0000726 | A1 * | 1/2009 | McCowin | B29C 33/308 156/212 |
| 2010/0126658 | A1 * | 5/2010 | De Vita | B29C 70/544 156/243 |
| 2010/0314042 | A1 * | 12/2010 | Luebbering | B29C 33/405 156/286 |
| 2010/0314807 | A1 * | 12/2010 | Lengsfeld | B29C 70/46 264/571 |
| 2011/0104432 | A1 * | 5/2011 | Duqueine | B29D 99/0003 428/113 |
| 2013/0299073 | A1 * | 11/2013 | Piedmont | B29C 70/44 156/60 |
| 2014/0190625 | A1 | 7/2014 | Buttrick et al. | |
| 2014/0239540 | A1 * | 8/2014 | Plante | B29C 33/48 425/111 |
| 2014/0314996 | A1 | 10/2014 | Stewart | |
| 2015/0343716 | A1 * | 12/2015 | Feeney | B29C 70/543 425/500 |
| 2016/0176122 | A1 | 6/2016 | Anderson et al. | |
| 2019/0039333 | A1 * | 2/2019 | Mehling | B29C 70/44 |

FOREIGN PATENT DOCUMENTS

| | | |
|---|---|---|
| JP | 2016508900 A | 3/2016 |
| JP | 2016521221 A | 7/2016 |
| JP | 2017128012 A | 7/2017 |
| JP | 2019209520 A | 12/2019 |
| WO | 2014107243 A1 | 7/2014 |
| WO | 2014172073 A1 | 10/2014 |

* cited by examiner

JIG AND COMPOSITE MATERIAL PROCESSING METHOD

RELATED APPLICATIONS

The present application is a National Phase of International Application Number PCT/JP2020/023865 filed Jun. 17, 2020.

TECHNICAL FIELD

The present disclosure relates to a jig and a composite material processing method.

BACKGROUND ART

A composite material, for example, carbon fiber reinforced plastic (CFRP) is sometimes used for aircraft components such as a fuselage and a main wing of an aircraft. A structural member made of CFRP, which configures an aircraft component, has various shapes. As one method for manufacturing a structural member using such a composite material, a method in which a flat fiber sheet laminate (also referred to as a charge) is produced by laminating a plurality of fiber sheets (prepregs or the like), this laminate is placed on a mold having a final shape, the laminate is covered with a bag, and heat and pressure are applied to the laminate in an autoclave to cure the laminate is known (for example, PTL 1).

CITATION LIST

Patent Literature

[PTL 1] Japanese Unexamined Patent Application Publication No. 2017-128012

SUMMARY OF INVENTION

Technical Problem

There is a case where the composite material has a curved portion in the shape of a cross section when cut in a plane orthogonal to a longitudinal direction (hereinafter, referred to as a "cross section in the longitudinal direction"). When the composite material having such a curved portion is covered with a bag and pressurized, there is a case where pressure is not appropriately applied to the curved portion. If pressure is not appropriately applied to the composite material, there is a possibility that wrinkles or shape defects may occur in the composite material (structural member) after pressurization.

In order to solve this problem, it is conceivable to dispose a pressurizing block (jig) having a shape corresponding to the shape of the curved portion at the curved portion of the composite material. By disposing the pressurizing block, the pressure can be applied to the curved portion of the composite material through the pressurizing block, so that the pressure can be appropriately applied to the curved portion.

Although the pressurizing block is formed in a shape corresponding to the shape of the curved portion, since the shape of the composite material is not constant, in a case where the pressurizing block has high rigidity (is difficult to be deformed), when the pressurizing block is disposed at the curved portion, there is a case where a portion where the pressurizing block and the curved portion come into contact with each other and a portion where a gap is formed between the pressurizing block and the curved portion are generated. In the portion where a gap is formed between the pressurizing block and the curved portion, pressure is not appropriately applied to the composite material. Therefore, in the pressurizing block having high rigidity, there is a possibility that pressure may not be applied to the entire composite material.

On the other hand, for example, in a composite material to be pressurized, there is a case where not only the shape of the cross section in the longitudinal direction has a curved portion, but also a part of the shapes of the cross section when cut in a plane orthogonal to an intersection direction intersecting the longitudinal direction is curved and/or bent. In such a case, in the curved portion (contour portion) or the bent portion (kink portion), wrinkles easily occur due to excess or shortage of fibers of the fiber sheet. When the composite material is processed in this manner, there is a case where irregularities such as wrinkles may occur in a part of the composite material. If irregularities such as wrinkles occur in a part of the composite material, there is a possibility that the strength of the manufactured structural member may be reduced. Therefore, it is preferable to eliminate the irregularities such as wrinkles occurring in the composite material or to suppress the occurrence of irregularities such as wrinkles. However, in a case where the pressurizing block has low rigidity (is easily deformed), the pressurizing block that comes into contact with the composite material is deformed, and therefore, there is a possibility that the irregularities such as wrinkles occurring in the composite material may not be eliminated or the occurrence of wrinkles may not be suppressed.

The present disclosure has been made in view of such circumstances, and has an object to provide a jig and a composite material processing method, in which it is possible to apply pressure to the entire composite material and to eliminate wrinkles occurring in the composite material or suppress the occurrence of wrinkles.

Solution to Problem

A jig according to an aspect of the present disclosure is a jig which is configured such that, when a composite material having a curved portion curved in a shape of a cross section when cut in a plane orthogonal to a longitudinal direction is deformed into a shape corresponding to a mold by being pressurized in a state where the composite material is installed on the mold, the jig is brought into contact with the curved portion of the composite material, including: a first contact part that extends along the longitudinal direction and comes into contact with the curved portion of the composite material; and a second contact part that is partially provided along the longitudinal direction, comes into contact with the curved portion of the composite material, and has higher rigidity than the first contact part.

A composite material processing method according to another aspect of the present disclosure includes: an installation step of installing a composite material having a curved portion curved in a shape of a cross section when cut in a plane orthogonal to a longitudinal direction on a mold; a contact step of bringing a jig, which includes a first contact part that extends along the longitudinal direction and comes into contact with the curved portion of the composite material, and a second contact part that is partially provided along the longitudinal direction, comes into contact with the curved portion of the composite material, and has higher rigidity than the first contact part, into contact with the curved portion of the composite material; and a deformation step of pressurizing the composite material in a state of being installed on the mold in the installation step and brought into contact with the jig in the contact step to deform the composite material into a shape corresponding to the mold, in which in the contact step, a region where wrinkles easily occur, of the curved portion of the composite material, and the second contact part are brought into contact with each other.

Advantageous Effects of Invention

According to the present disclosure, it is possible to apply pressure to the entire composite material and to eliminate wrinkles occurring in the composite material or suppress the occurrence of wrinkles.

DESCRIPTION OF EMBODIMENTS

Hereinafter, embodiments of a jig and a composite material processing method according to the present disclosure will be described with reference to the drawings.

First Embodiment

A first embodiment of the present disclosure will be described with reference to FIGS. 1 to 5. In the present embodiment, a method for manufacturing a composite material structure by processing a composite material 10 by using a block (jig) 30 will be described. As the composite material structure, a stringer, a spar, a frame, a rib, or the like, which is an aircraft component configuring an aircraft structure, can be given as an example.

In the following description, a longitudinal direction of each of the block 30 and the composite material 10 is defined as an X-axis direction, a lateral direction of each of the block 30 and the composite material 10 is defined as a Y-axis direction, and a direction orthogonal to the X-axis direction and the Y-axis direction is defined as a Z-axis direction. In the present embodiment, since an example in which the Z-axis direction is an up-down direction is described, there is also a case where the Z-axis direction is referred to as the up-down direction. Further, each drawing schematically shows the length, angle, or the like of each member, and does not show the actual length, angle, or the like.

The composite material 10 is manufactured from, for example, a flat plate-shaped laminate that is produced by laminating fiber sheets infiltrated with resin. As an example of the fiber sheet, a prepreg can be given as an example. The fiber sheet configuring the laminate is not limited to the fiber sheet infiltrated with resin. The fiber sheet may be, for example, a fiber sheet using dry fibers that are not infiltrated with resin. The laminate is subjected to bending to be processed into the composite material 10 having a predetermined shape. In the present embodiment, by performing bending, the composite material 10 is processed so as to have a shape close to a composite material structure that is a final shape. Thereafter, as will be described later, the composite material 10 is installed on a mold 20 having a shape corresponding to the shape (final shape) of the composite material structure, and the composite material 10 is pressurized and heated in a state where the block 30 is installed on the composite material 10. In this way, the composite material 10 is deformed into a shape corresponding to the mold 20 and cured to manufacture a composite material structure. Details of a method of processing the composite material 10 will be described later.

Figure 1:
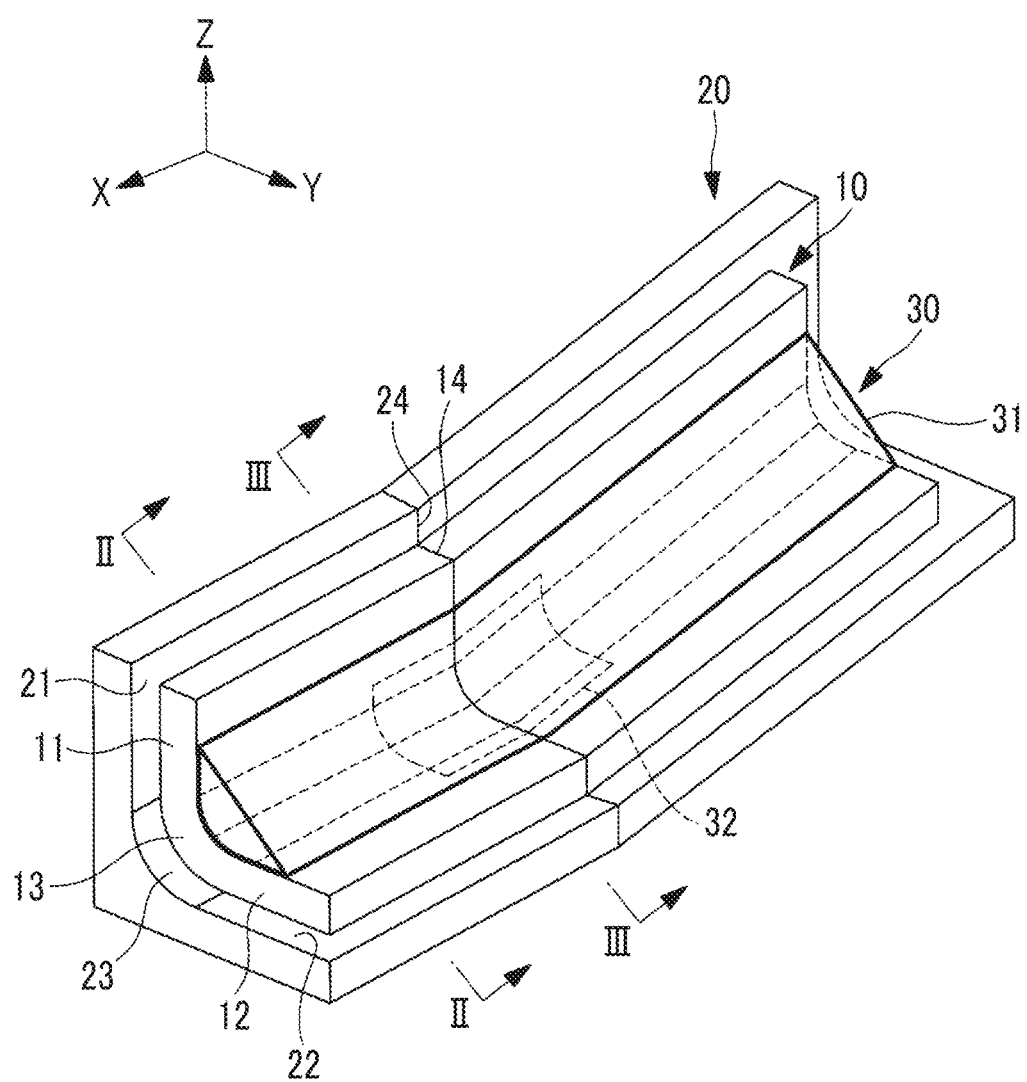
FIG. 1 is a perspective view showing a state where a composite material is processed by using a jig according to a first embodiment of the present disclosure.
Figure 2:
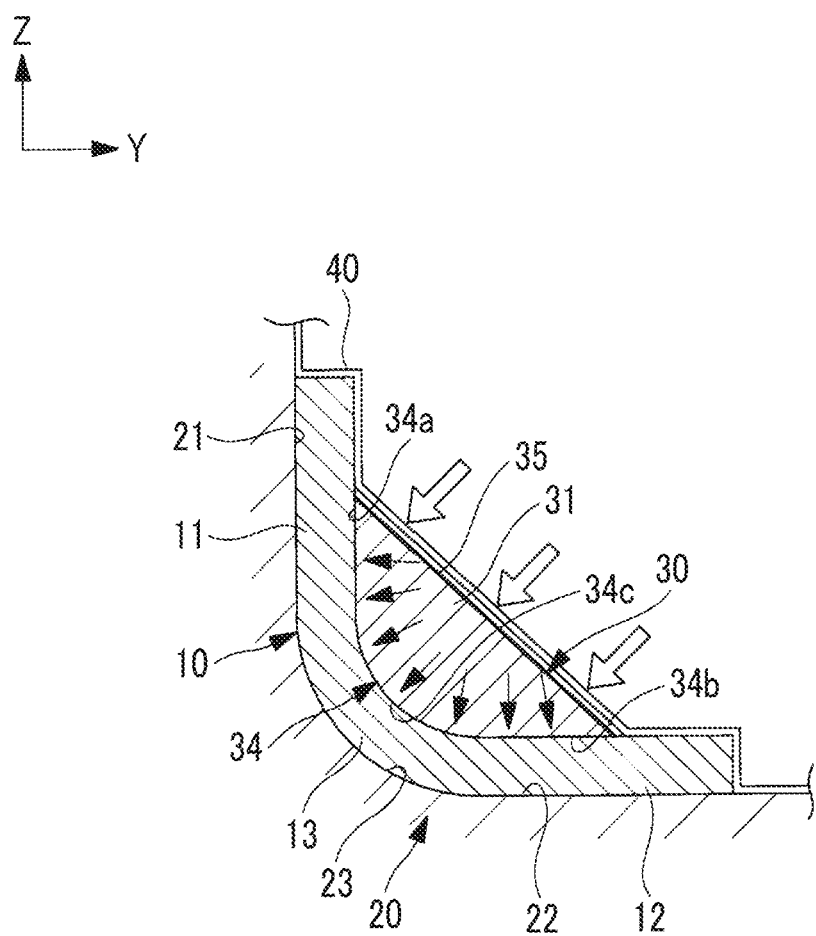
FIG. 2 is a sectional view showing a cross section taken along line II-II of FIG. 1 and viewed from the direction of an arrow.
Figure 3:
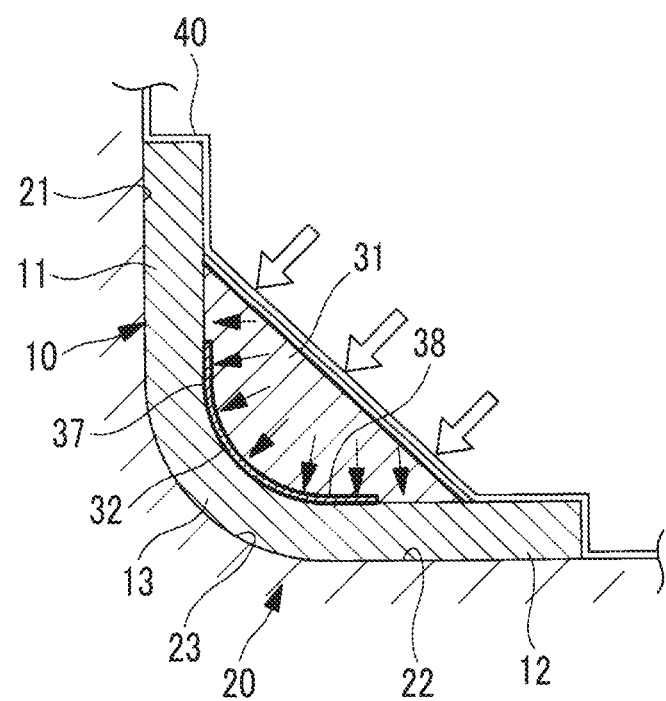
FIG. 3 is a sectional view showing a cross section taken along line III-III of FIG. 1 and viewed from the direction of an arrow.

As shown in FIGS. 1 to 3, the composite material 10 according to the present embodiment is a long member substantially L-shaped in a cross section when cut along a plane orthogonal to the X-axis direction (the longitudinal direction) (hereinafter referred to as a "cross section in the X-axis direction") and extending along the X-axis direction. Specifically, in the cross section in the X-axis direction, the composite material 10 has a first flat plate portion 11, a curved portion 13 curved from a lower end portion of the first flat plate portion 11, and a second flat plate portion 12 extending from an end portion in the Y-axis direction of the curved portion 13. In the following description, a surface where the first flat plate portion 11 and the second flat plate portion 12 face each other is referred to as an inner surface. Further, a surface of the curved portion 13, which is continuous with the inner surfaces of the first flat plate portion 11 and the second flat plate portion 12, is referred to as an inner surface. Further, a surface on the side opposite to the inner surface of each member is referred to as an outer surface.

The first flat plate portion 11 is a flat plate-shaped member in which a plate surface is disposed so as to follow the X-axis direction and the Z-axis direction. The first flat plate portion 11 extends such that the X-axis direction is the longitudinal direction.

The second flat plate portion 12 is a flat plate-shaped member in which a plate surface is disposed so as to follow the X-axis direction and the Y-axis direction. The second flat plate portion 12 extends such that the X-axis direction is the longitudinal direction.

The first flat plate portion 11 and the second flat plate portion 12 are disposed so as to form an angle of approximately 90 degrees. That is, the curved portion 13 connecting the first flat plate portion 11 and the second flat plate portion 12 is formed in an arc shape of approximately 90 degrees in the cross section in the X-axis direction. The curved portion 13 extends such that the X-axis direction is the longitudinal direction.

As shown in FIG. 1, the composite material 10 has a bent portion (a bent portion) that is bent in the shape of a cross section when cut in a plane orthogonal to the Z-axis direction (an intersection direction) (hereinafter, referred to as a "cross section in the Z-axis direction"). Therefore, the first flat plate portion 11, the second flat plate portion 12, and the curved portion 13 have composite material bent portions (bent portions) 14 that are bent in the shape of the cross section when cut in the plane orthogonal to the Z-axis direction (the intersection direction) (hereinafter, referred to as the "cross section in Z-axis direction").

The mold 20 on which the composite material 10 is installed has a shape corresponding to the composite material 10 to be manufactured. As shown in FIGS. 1 to 3, the mold 20 has a first flat surface portion 21 that comes into contact with the outer surface of the first flat plate portion 11, a curved surface portion 23 that comes into contact with the outer surface of the curved portion 13, and a second flat surface portion 22 that comes into contact with the outer surface of the second flat plate portion 12. Further, the first flat surface portion 21, the second flat surface portion 22, and the curved surface portion 23 have mold bent portions 24 that are bent in the shape of the cross section in the Z-axis direction.

Next, the block 30 will be described.

As shown in FIGS. 1 to 3, the block 30 is installed on the composite material 10. Specifically, the block 30 is installed so as to come into contact with the inner surface of the first flat plate portion 11, the inner surface of the second flat plate portion 12, and the inner surface of the curved portion 13 of the composite material 10.

Figure 4:
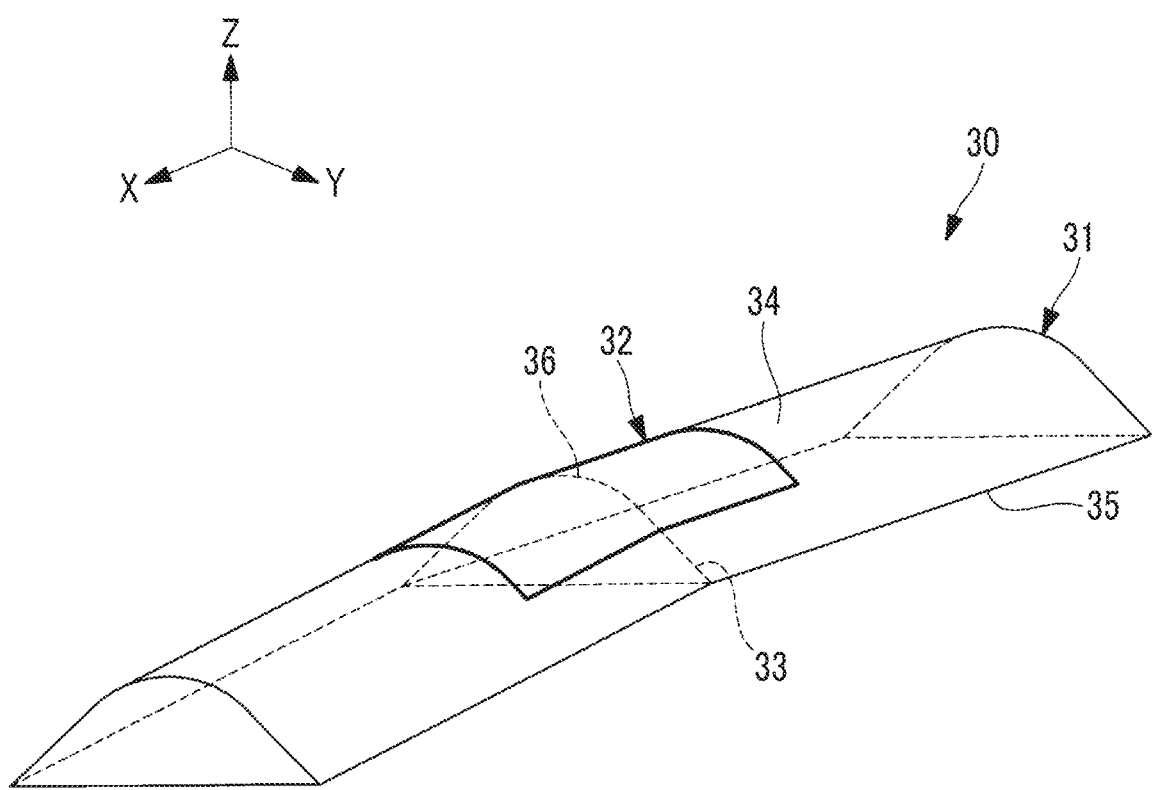
FIG. 4 is a perspective view showing the jig in FIG. 1.

As shown in FIGS. 1 and 4, the block 30 has a first contact part 31 that is provided along the Y-axis direction, and a second contact part 32 that is partially provided along the Y-axis direction.

The first contact part 31 is a columnar member extending along the Y-axis direction. The length in the Y-axis direction of the first contact part 31 is substantially the same as the length in the Y-axis direction of the composite material 10.

The first contact part 31 is formed of a member having flexibility. Further, the first contact part 31 has lower rigidity than the second contact part 32. Further, the first contact part 31 may have lower rigidity than the composite material 10. The first contact part 31 has rigidity in which it is deformed according to the shape of the composite material 10 when pressurized to be pressed against the composite material 10. Specifically, the first contact part 31 is formed of, for example, a rubber member that is typified by silicone or the like. The material of the first contact part 31 is not limited to the rubber member. Any material may be used as long as it has lower rigidity than the second contact part 32.

The first contact part 31 has a first block bent portion 33 that is bent in the shape of the cross section in the Z-axis direction. The first contact part 31 has a facing surface 34 facing the curved portion 13 of the composite material 10, and a bag contact surface 35 that comes into contact with a bag 40 (refer to FIGS. 2 and 3) (described later). The facing surface 34 and the bag contact surface 35 are disposed such that the X-axis direction is the longitudinal direction.

Most regions of the facing surface 34 come into contact with the composite material 10 in a state where the block 30 is installed on the composite material 10. Specifically, in the facing surface 34, a region other than the region where the second contact part 32 is provided comes into contact with the composite material 10.

As shown in FIG. 2, the facing surface 34 has a planar first facing surface 34a that comes into contact with the inner surface of the first flat plate portion 11 of the composite material 10, a planar second facing surface 34b that comes into contact with the inner surface of the second flat plate portion 12, and a curved facing surface 34c that connects the first facing surface 34a and the second facing surface 34b and comes into contact with the inner surface of the curved portion 13. The first facing surface 34a, the curved facing surface 34c, and the second facing surface 34b are continuous. The curved facing surface 34c has an arc shape of approximately 90 degrees in the cross section in the X-axis direction.

The bag contact surface 35 is a surface having a planar shape and connecting an upper end portion of the facing surface 34 (an upper end of the first facing surface 34a) and a lower end portion of the facing surface 34 (an end portion in the Y-axis direction of the second facing surface 34b).

As shown in FIGS. 1 and 3, the second contact part 32 is a plate-shaped member. The second contact part 32 is provided on the facing surface 34 of the first contact part 31. That is, the second contact part 32 is provided between the first contact part 31 and the composite material 10 in a state where the block 30 is installed on the composite material 10. The second contact part 32 is provided so as to cover a predetermined region centered on the first block bent portion 33 of the facing surface 34. The second contact part 32 is fixed to the facing surface 34 of the first contact part 31. That is, the second contact part 32 and the first contact part 31 are integrally provided. The second contact part 32 does not need to be fixed to the facing surface 34 of the first contact part 31. That is, the first contact part 31 and the second contact part 32 may be separate bodies.

The second contact part 32 has higher rigidity than the first contact part 31. Further, the second contact part 32 may have higher rigidity than the composite material 10. The second contact part 32 has rigidity in which it is not deformed when pressurized to be pressed against the composite material 10. Specifically, the second contact part 32 is formed of, for example, resin or metal. The expression "not deformed" means that the second contact part 32 is not deformed to such an extent that it cannot realize a function as the second contact part 32, and it goes without saying that some deformation is allowed. Further, the material of the second contact part 32 is not limited to resin or metal. Any material may be used as long as it has higher rigidity than the first contact part 31.

As shown in FIGS. 1 and 4, the length in the X-axis direction of the second contact part 32 is shorter than the length in the X-axis direction of the first contact part 31. The second contact part 32 covers a region of a part of the facing surface 34 in the X-axis direction. Further, the length in the X-axis direction of the second contact part 32 is about twice the length in the X-axis direction of a region where wrinkles occur.

The length in the Z-axis direction and the Y-axis direction of the second contact part 32 is shorter than the length in the Z-axis direction and the Y-axis direction of the first contact part 31. The second contact part 32 covers a region of a part of the facing surface 34 in the Z-axis direction and the Y-axis direction. Further, the length in the Z-axis direction and the Y-axis direction of the second contact part 32 is about twice the length in the Z-axis direction and the Y-axis direction of the region where wrinkles occur.

The length in the X-axis direction, the Z-axis direction, and the Y-axis direction of the second contact part 32 is not limited to the example described above. It is acceptable if the length in the X-axis direction, the Z-axis direction, and the Y-axis direction of the second contact part 32 is a length that can cover the region where wrinkles occur.

The second contact part 32 has a second block bent portion 36 that is bent in the shape of the cross section in the Z-axis direction. The second block bent portion 36 is disposed so as to come into contact with the first block bent portion 33 and the composite material bent portion 14.

The second contact part 32 has a first contact surface 37 that comes into contact with the curved portion 13 of the composite material 10, and a second contact surface 38 that comes into contact with the first contact part 31. The facing surface 34 and the bag contact surface 35 are surfaces extending along the X-axis direction. Further, the second contact part 32 has an arc shape of approximately 90 degrees in the shape of the cross section in the X-axis direction at a portion coming into contact with the curved facing surface 34c, of the first contact part 31.

The bending angle of the second block bent portion 36 is substantially the same as the bending angles of the first block bent portion 33, the composite material bent portion 14, and the mold bent portion 24.

Next, the method of processing the composite material 10 will be described.

First, as shown in FIGS. 1 to 3, the composite material 10 formed into a predetermined shape is installed on the mold 20 (an installation step). At this time, the composite material 10 is installed such that the curved surface portion 23 of the mold 20 and the curved portion 13 of the composite material 10 come into contact with each other.

Next, the block 30 is installed on the composite material 10 such that the curved portion 13 and the block 30 come into contact with each other (a contact step). Specifically, the block 30 is installed such that the composite material bent portion 14 and the second block bent portion 36 of the second contact part 32 come into contact with each other.

Next, as shown in FIGS. 2 and 3, the mold 20, the composite material 10, and the block 30 are covered with the bag 40. Then, end portions of the bag 40 are bonded to the mold 20 to create a state where the composite material 10 and the block 30 are sealed inside the bag 40.

Next, the composite material 10 and the block 30 in the sealed state are placed in an autoclave and pressurized. In this way, pressure is applied to the block 30 as shown by white arrows in FIGS. 2 and 3. When the pressure is applied to the block 30, the first contact part 31 having low rigidity is deformed according to the shape of the composite material 10. In this way, the entire block 30 comes into contact with the composite material 10. Specifically, the second contact part 32 comes into contact with the region which is centered on the composite material bent portion 14 and in which wrinkles easily occur, and the first contact part 31 comes into contact with the region other than the region where wrinkles easily occur. The entire block 30 and the composite material 10 come into contact with each other, so that the block 30 presses the composite material 10 against the mold 20. Therefore, as shown by black arrows in FIGS. 2 and 3, pressure is uniformly applied to the composite material 10 through the block 30. When the pressure is applied to the composite material 10, the composite material 10 is deformed according to the shape of the mold 20 (a deformation step). Further, the composite material 10 is heated in the autoclave, so that the composite material 10 is cured.

The method of pressurizing and heating the composite material 10 and the block 30 is not limited to the method using an autoclave.

In this way, the composite material 10 is processed to manufacture a composite material structure having a desired shape.

According to the present embodiment, the following operation and effects are exhibited.

In the present embodiment, the first contact part 31 extending along the X-axis direction and coming into contact with the curved portion 13 of the composite material 10 is provided. Since the first contact part 31 has lower rigidity than the second contact part 32, when the composite material 10 is pressurized in a state where the block 30 is in contact with the curved portion 13, the first contact part 31 is easily deformed according to the shape of the curved portion 13. In this way, it is possible to make it difficult for a gap to be formed between the first contact part 31 and the curved portion 13 of the composite material 10. Therefore, in the region where the first contact part 31 and the composite material 10 come into contact with each other, pressure can be applied to the entire composite material 10 through the block 30.

Further, in the present embodiment, the second contact part 32 that is partially provided along the X-axis direction and comes into contact with the composite material 10 is provided. Since the second contact part 32 has higher rigidity than the first contact part 31, even if the composite material 10 is pressurized in a state where the block 30 is in contact with the curved portion 13, the second contact part 32 is difficult to be deformed. In this way, in a case where irregularities such as wrinkles are present in the curved portion 13 that comes into contact with the second contact part 32, the second contact part 32 pushes in protrusion portions, so that the irregularities such as wrinkles can be eliminated. Further, when the composite material 10 is pressurized and deformed, it is possible to make it difficult for irregularities such as wrinkles to occur in the curved portion 13 in the region where the composite material 10 comes into contact with the second contact part 32.

Therefore, when the composite material 10 is pressurized and deformed, due to the second contact part 32 being brought into contact with the region where wrinkles easily occur in the composite material 10 and the first contact part 31 being brought into contact with the region where wrinkles are difficult to occur (the region other than the region with which the second contact part 32 comes into contact), pressure is applied to the entire composite material 10, so that it is possible to eliminate wrinkles and/or suppress the occurrence of wrinkles in the region where wrinkles easily occur.

Figure 5:
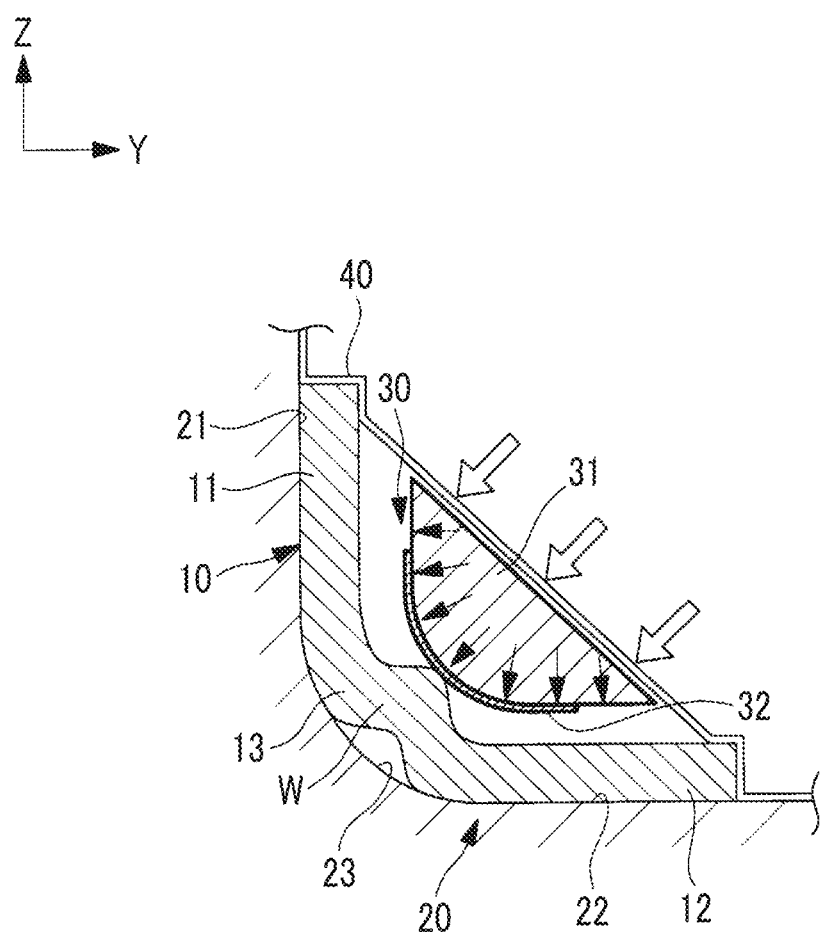
FIG. 5 is a sectional view showing a state where wrinkles are formed in the composite material in FIG. 3.

Further, in the present embodiment, the composite material 10 has the composite material bent portion 14. In the composite material 10, in a bent portion (in the present embodiment, the composite material bent portion 14) such as a curved portion (contour portion) or a bent portion (kink portion), excess or shortage of the fibers of the fiber sheet occurs. Therefore, a compressive force or a tensile force acts on the composite material 10, so that, as shown in FIG. 5, irregularities such as wrinkles (hereinafter referred to as "wrinkles W") easily occur in the bent portion. In the present embodiment, the composite material bent portion 14 in which wrinkles W easily occur and the second contact part 32 having high rigidity come into contact with each other. In this way, when pressure is applied to the block 30, the second contact part 32 pushes in the protrusion portions of the wrinkles W, so that the wrinkles W can be eliminated. That is, a state where the wrinkles W are present, shown in FIG. 5, can be changed to a state where the wrinkles W are not present, shown in FIG. 3.

Further, when the composite material 10 is processed, the second contact part 32 having high rigidity presses the region where the wrinkles W easily occur, and therefore, it is possible to make it difficult for the wrinkles W to occur in the composite material 10 in the region which comes into contact with the second contact part 32. That is, it is possible to make it difficult for the state where the wrinkles W are not present, shown in FIG. 3, to be changed to the state where the wrinkles W are present, shown in FIG. 5.

Further, in the present embodiment, the first contact part 31 is provided over the entire area in the X-axis direction of the composite material 10, and the second contact part 32 is provided on the facing surface 34 of the first contact part 31. In this way, the block 30 can be configured merely by installing the second contact part 32 on the facing surface 34 of the first contact part 31. Therefore, the block 30 can be easily manufactured.

Second Embodiment

A second embodiment of the present disclosure will be described using FIGS. 6 and 7.

In the present embodiment, the structure of the block 30 is different from that in the first embodiment. Since other points are the same as those in the first embodiment, the same configurations are denoted by the same reference numerals, and detailed description thereof will be omitted.

Figure 6:
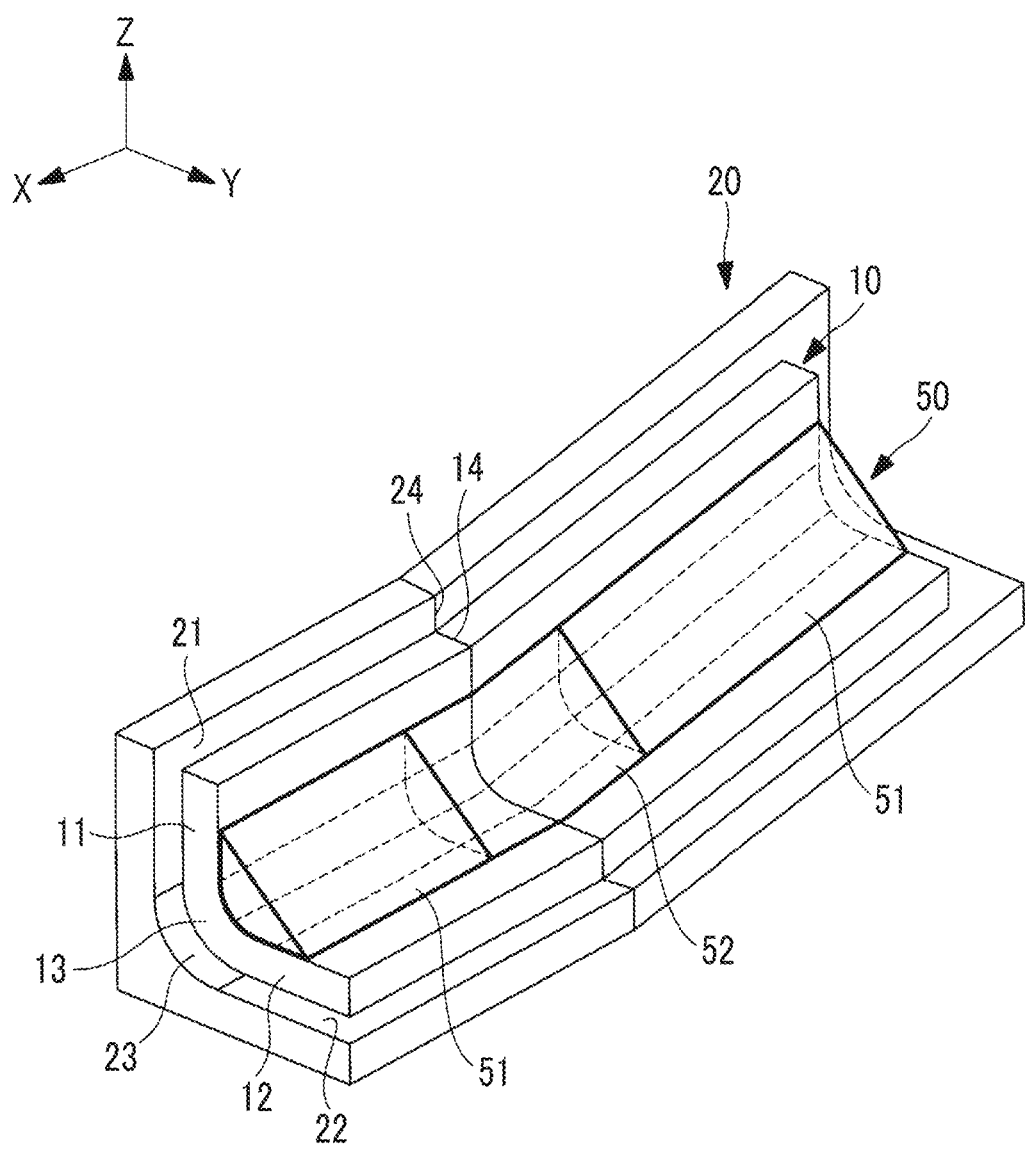
FIG. 6 is a perspective view showing a state where a composite material is processed by using a jig according to a second embodiment of the present disclosure.
Figure 7:
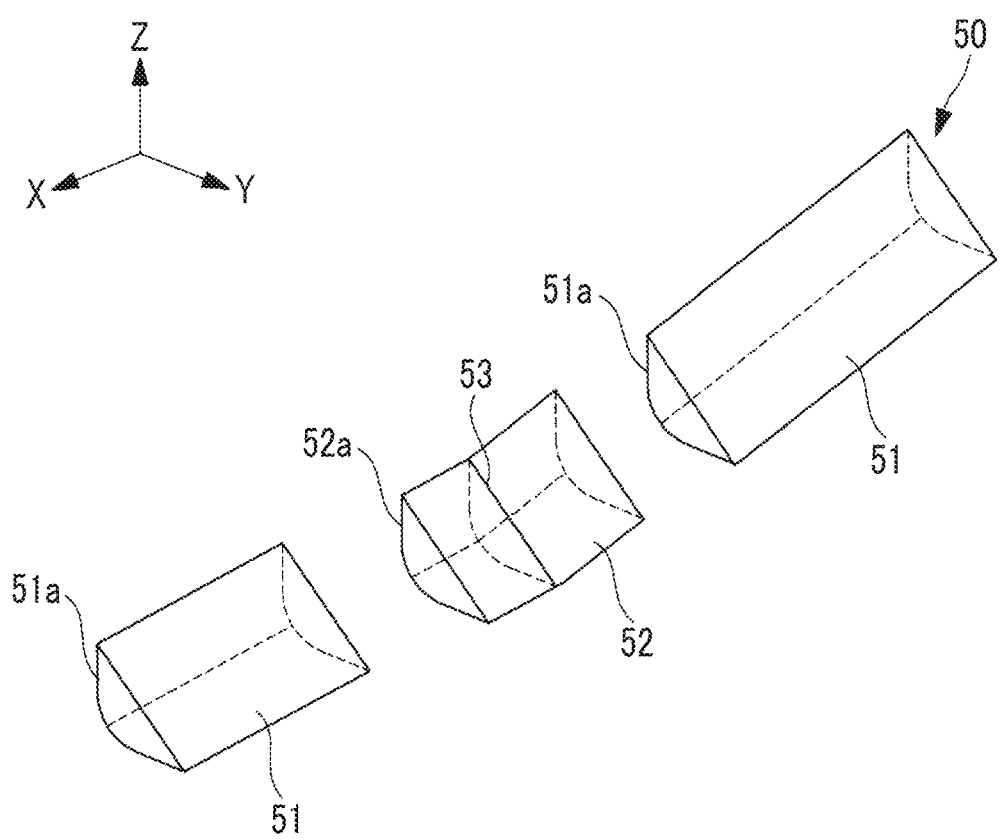
FIG. 7 is an exploded perspective view showing the jig in FIG. 6.

As shown in FIGS. 6 and 7, in a block 50 according to the present embodiment, a first contact part 51 and a second contact part 52 are disposed side by side along the X-axis direction. The first contact part 51 and the second contact part 52 are fixed. Further, the shape of the cross section in the X-axis direction of the first contact part 51 and the shape of the cross section in the X-axis direction of the second contact part 52 are substantially the same.

The first contact part 51 is divided into two parts with the second contact part 52 interposed therebetween. Since the shape of the cross section in the X-axis direction of each first contact part 51 is substantially the same as the shape of the cross section in the X-axis direction of the first contact part 31 of the first embodiment, detailed description will be omitted.

The second contact part 52 has a third block bent portion 53 that is bent in the shape of the cross section in the Z-axis direction. Since the third block bent portion 53 has substantially the same structure as the first block bent portion 33 of the first embodiment, detailed description thereof will be omitted.

Each first contact part 51 and the second contact part 52 are disposed such that a facing surface 51a (a surface facing the curved portion 13 and the like of the composite material 10) of each first contact part 51 and a facing surface 52a of the second contact part 52 are flush with each other.

The block 50 of the present embodiment is installed on the composite material 10 such that the facing surfaces 51a of the first contact parts 51 and the facing surface 52a of the second contact part 52 come into contact with the composite material 10.

According to the present embodiment, the following operation and effects are exhibited.

In the present embodiment, the first contact part 51 and the second contact part 52 are disposed side by side along the X-axis direction. Therefore, in a case where the region where the wrinkles W (refer to FIG. 5) easily occur and the region where the wrinkles W are difficult to occur are arranged along the X-axis direction in the composite material 10, it is possible to more preferably bring the second contact part 52 into contact with the region where the wrinkles W easily occur, of the composite material 10, and bring the first contact part 51 into contact with the region where the wrinkles W are difficult to occur (the region other than the region with which the second contact part 52 comes into contact).

Further, the first contact part 51 and the second contact part 52 are disposed such that the facing surface 51a of the first contact part 51 and the facing surface 52a of the second contact part 52 are flush with each other. In this way, the first contact part 51 and the second contact part 52 can be easily brought into contact with the curved portion 13 of the composite material 10. Therefore, it is possible to more preferably apply pressure to the composite material 10.

The present disclosure is not limited to each of the embodiments described above, and can be appropriately modified within a scope which does not depart from the gist thereof.

For example, in each of the embodiments described above, the example in which one second contact part 32 or 52 having high rigidity is provided has been described. However, the present disclosure is not limited to this. For example, in a case where a plurality of composite material bent portions 14 are formed on the composite material 10, a plurality of second contact parts 32 or 52 may be provided. In this case, the second contact part 32 or 52 may be brought into contact with each composite material bent portion 14.

Further, in each of the embodiments described above, the example in which the composite material 10 has the composite material bent portion 14 has been described. However, the present disclosure is not limited to this. For example, a part of the composite material 10 may be curved in the cross section in the Z-axis direction. In this case, the mold 20 and the block 30 or 50 are also formed so as to have a curved portion according to the shape of the composite material 10.

The jig and the composite material processing method described in each embodiment are grasped as follows, for example.

The jig (30) according to an aspect of the present disclosure is a jig (30) which is configured such that, when a composite material (10) having a curved portion (13) curved in a shape of a cross section when cut in a plane orthogonal to a longitudinal direction (an X-axis direction) is deformed into a shape corresponding to a mold (20) by being pressurized in a state where the composite material is installed on the mold, the jig is brought into contact with the curved portion of the composite material, including: a first contact part (31) that extends along the longitudinal direction and comes into contact with the curved portion of the composite material; and a second contact part (32) that is partially provided along the longitudinal direction, comes into contact with the curved portion of the composite material, and has higher rigidity than the first contact part.

In the above configuration, the first contact part extending along the longitudinal direction and coming into contact with the curved portion of the composite material is provided. Since the first contact part has lower rigidity than the second contact part, when the composite material is pressurized in a state of bringing the jig into contact with the curved portion, the first contact part is easily deformed according to the shape of the curved portion. In this way, it is possible to make it difficult for a gap to be formed between the first contact part and the curved portion of the composite material. Therefore, in the region where the first contact part and the composite material come into contact with each other, pressure can be applied to the entire composite material through the jig.

Further, in the above configuration, the second contact part that is partially provided along the longitudinal direction and comes into contact with the composite material is provided. Since the second contact part has higher rigidity than the first contact part, the second contact part is difficult to be deformed even if the composite material is pressurized in a state of bringing the jig into contact with the curved portion. In this way, in a case where irregularities such as wrinkles are present in the curved portion that comes into contact with the second contact part, the second contact part pushes in the protrusion portions, so that the irregularities such as wrinkles can be eliminated. Further, when the composite material is pressurized and deformed, it is possible to make it difficult for irregularities such as wrinkles to occur in the curved portion in the region that comes into contact with the second contact part.

Therefore, when the composite material is pressurized and deformed, by bringing the second contact part into contact with the region where wrinkles easily occur in the composite material, and bringing the first contact part into contact with the region where wrinkles are difficult to occur (the region other than the region with which the second contact part comes into contact), it is possible to apply pressure to the entire composite material and to eliminate wrinkles and/or suppress the occurrence of wrinkles in the region where wrinkles easily occur.

Further, in the jig according to the above aspect of the present disclosure, the composite material has a bent portion (14) in which a part of a shape of a cross section when cut in a plane orthogonal to an intersection direction intersecting the longitudinal direction is curved and/or bent, and the second contact part comes into contact with the bent portion.

In the above configuration, the composite material has the bent portion. In the composite material, irregularities such as wrinkles easily occur in the bent portion such as a curved portion (contour portion) or a bent portion (kink portion). In the above configuration, since the bent portion where irregularities such as wrinkles easily occur and the second contact part having high rigidity come into contact with each other, it is possible to more preferably eliminate the irregularities such as wrinkles by causing the second contact part to push in the protrusion portions. Further, when the composite material is pressurized and deformed, it is possible to make it difficult for irregularities such as wrinkles to occur in the curved portion in the region that comes into contact with the second contact part.

Further, in the jig according to the above aspect of the present disclosure, the first contact part is provided over an entire area in the longitudinal direction, and the second contact part is provided on a surface facing the curved portion, of the first contact part.

In the above configuration, the first contact part is provided over the entire area in the longitudinal direction of the composite material, and the second contact part is provided on the surface (hereinafter referred to as a "facing surface") facing the curved portion, of the first contact part. In this way, the jig can be configured merely by installing the second contact part on the facing surface of the first contact part. Therefore, the jig can be easily configured.

Further, in the jig according to the above aspect of the present disclosure, the first contact part and the second contact part are disposed side by side along the longitudinal direction.

In the above configuration, the first contact part and the second contact part are disposed side by side along the longitudinal direction. Therefore, in a case where the region where wrinkles easily occur and the region where wrinkles are difficult to occur are arranged along the longitudinal direction in the composite material, it is possible to more preferably bring the second contact part into contact with the region where wrinkles easily occur in the composite material, and bring the first contact part into contact with the region where wrinkles are difficult to occur (the region other than the region with which the second contact part comes into contact).

The first contact part and the second contact part may be disposed such that the surface of the first contact part, which comes into contact with the curved portion, and the surface of the second contact part, which comes into contact with the curved portion, are flush with each other. With such a configuration, the first contact part and the second contact part can be easily brought into contact with the curved portion of the composite material. Therefore, it is possible to more preferably apply pressure to the composite material.

A composite material processing method according to another aspect of the present disclosure includes: an installation step of installing a composite material (10) having a curved portion (13) curved in a shape of a cross section when cut in a plane orthogonal to a longitudinal direction (an X-axis direction) on a mold (20); a contact step of bringing a jig (30), which includes a first contact part (31) that extends along the longitudinal direction and comes into contact with the curved portion of the composite material, and a second contact part (32) that is partially provided along the longitudinal direction, comes into contact with the curved portion of the composite material, and has higher rigidity than the first contact part, into contact with the curved portion of the composite material; and a deformation step of pressurizing the composite material in a state of being installed on the mold in the installation step and brought into contact with the jig in the contact step to deform the composite material into a shape corresponding to the mold, in which in the contact step, a region where wrinkles easily occur, of the curved portion of the composite material, and the second contact part are brought into contact with each other.

Further, in the composite material processing method according to the above aspect of the present disclosure, the composite material has a bent portion (14) in which a part of a shape of a cross section when cut in a plane orthogonal to an intersection direction intersecting the longitudinal direction is curved and/or bent, and in the contact step, a region that includes the bent portion and the second contact part are brought into contact with each other.

REFERENCE SIGNS LIST

10: composite material
11: first flat plate portion
12: second flat plate portion
13: curved portion
14: composite material bent portion (bent portion)
20: mold
21: first flat surface portion
22: second flat surface portion
23: curved surface portion
24: mold bent portion
30: block (jig)
31: first contact part
32: second contact part
33: first block bent portion
34: facing surface
34a: first facing surface
34b: second facing surface
34c: curved facing surface
35: bag contact surface
36: second block bent portion
37: first contact surface
38: second contact surface
40: bag
50: block
51: first contact part
51a: facing surface
52: second contact part 52a: facing surface
53: third block bent portion
W: wrinkle

The invention claimed is:

1. A composite material processing system comprising:
a mold comprising a curved portion extending in a longitudinal direction;
a jig configured to be brought into contact with a curved portion of a composite material placed on the curved portion of the mold, the jig comprising:
a first contact part that extends along the longitudinal direction; and
a second contact part that is only partially provided along the longitudinal direction, comes into contact with the curved portion of the composite material, and has higher rigidity than the first contact part.

2. The composite material processing system according to claim 1,
wherein the second contact part is configured to contact a bent portion of the composite material in the longitudinal direction.

3. The composite material processing system according to claim 1,
wherein the first contact part is provided over an entire area in the longitudinal direction, and
the second contact part is provided on a surface of the curved portion of the first contact part facing the composite material.

4. The composite material processing system according to claim 1,
wherein the first contact part and the second contact part are disposed side-by-side along the longitudinal direction.

5. A composite material processing method comprising:
an installation step of installing a composite material having a curved portion in a plane orthogonal to a longitudinal direction on a mold comprising a curved portion extending in the longitudinal direction;
a contact step of bringing a jig, which includes a first contact part that extends along the longitudinal direction and comes into contact with the curved portion of the composite material, and a second contact part only partially provided along the longitudinal direction and having a higher rigidity than the first contact part, into contact with the curved portion of the composite material; and
a deformation step of pressurizing the composite material in stalled on the mold in the installation step with the jig in the contact step to deform the composite material into a shape corresponding to the mold.

6. The composite material processing method according to claim 5, wherein the composite material has a bent portion in the longitudinal direction, and in the contact step, the second contact part is brought into contact with the bent portion.

* * * * *